No. 894,746. PATENTED JULY 28, 1908.
H. W. REYNOLDS.
COFFEE PERCOLATOR.
APPLICATION FILED AUG. 9, 1907.
2 SHEETS—SHEET 1.
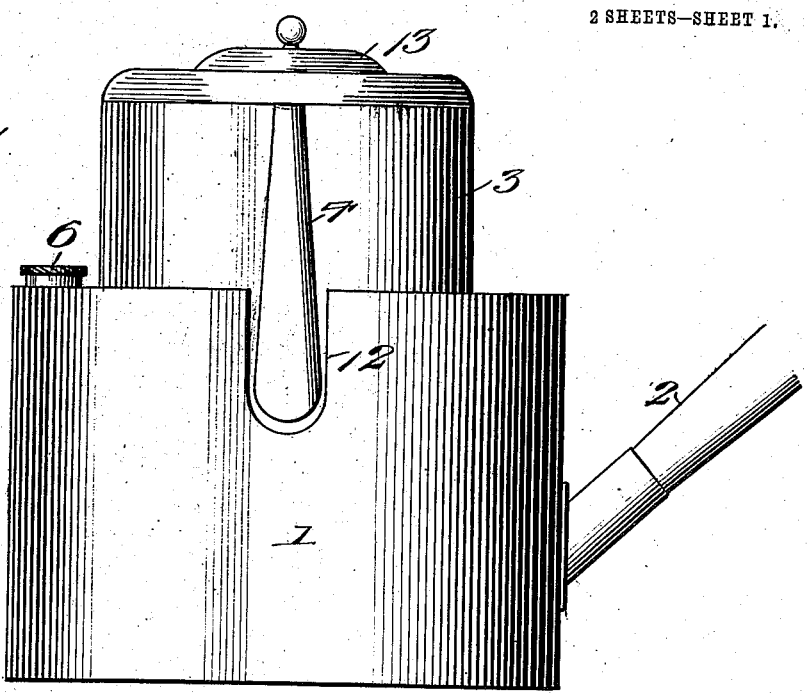
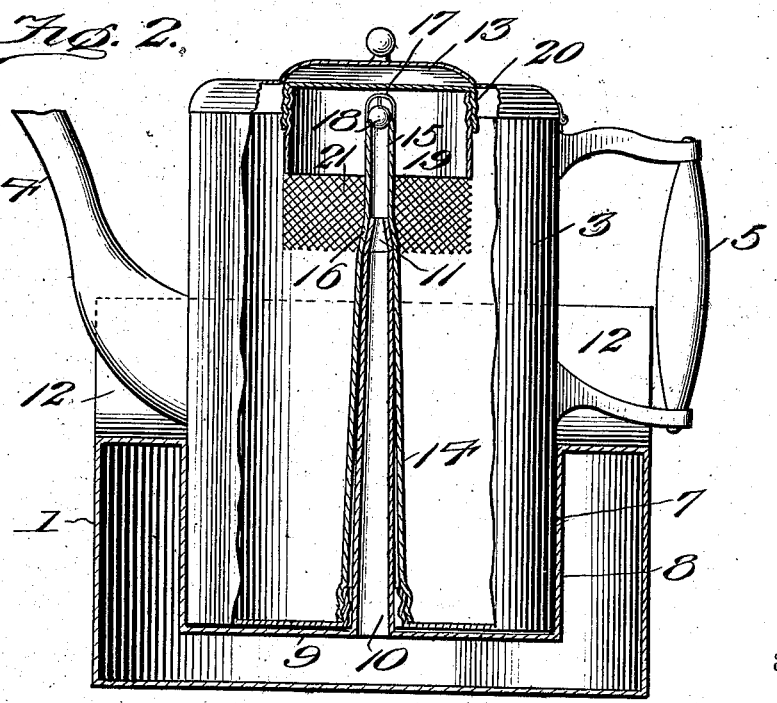
Witnesses
Wm Koerth.
C. C. Hines.
Inventor
Howard W. Reynolds.
By Victor J. Evans
Attorney No. 894,746. PATENTED JULY 28, 1908.
H. W. REYNOLDS.
COFFEE PERCOLATOR.
APPLICATION FILED AUG. 9, 1907.

2 SHEETS—SHEET 2.

Witnesses

Inventor
Howard W. Reynolds,
By Victor J. Evans
Attorney

UNITED STATES PATENT OFFICE.

HOWARD W. REYNOLDS, OF NEW YORK, N. Y., ASSIGNOR OF ONE-FOURTH TO SCOTT C. ROSS, OF NEW YORK, N. Y.

COFFEE-PERCOLATOR.

No. 894,746.　　　　Specification of Letters Patent.　　　Patented July 28, 1908.

Application filed August 9, 1907. Serial No. 387,885.

*To all whom it may concern:*

Be it known that I, HOWARD W. REYNOLDS, a citizen of the United States, residing at New York, in the county of New York and State of New York, have invented new and useful Improvements in Coffee-Percolators, of which the following is a specification.

This invention relates to percolators primarily designed for making "drip" coffee, and its object is to provide a percolator comprising a boiler and a pot removable therefrom and having a percolating chamber in its upper portion and means for conducting the steam and hot water from the boiler thereto, so that the water passing as such from the boiler and the water of condensation from the steam will percolate through the mass of coffee in the percolating chamber and extract the soluble substances therefrom and pass into the pot for use; the construction and arrangement of parts being such as to secure certain advantages in operation and a superior product, as hereinafter described.

Figure 3:
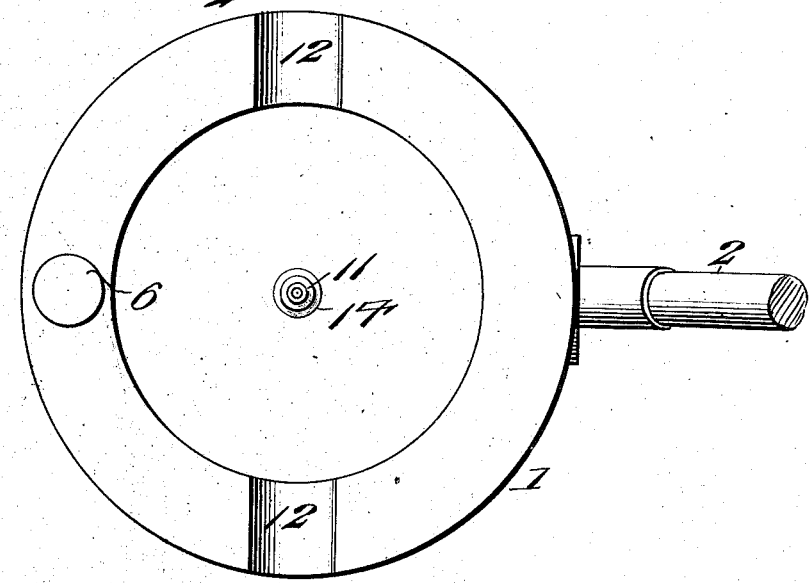
Figure 4:
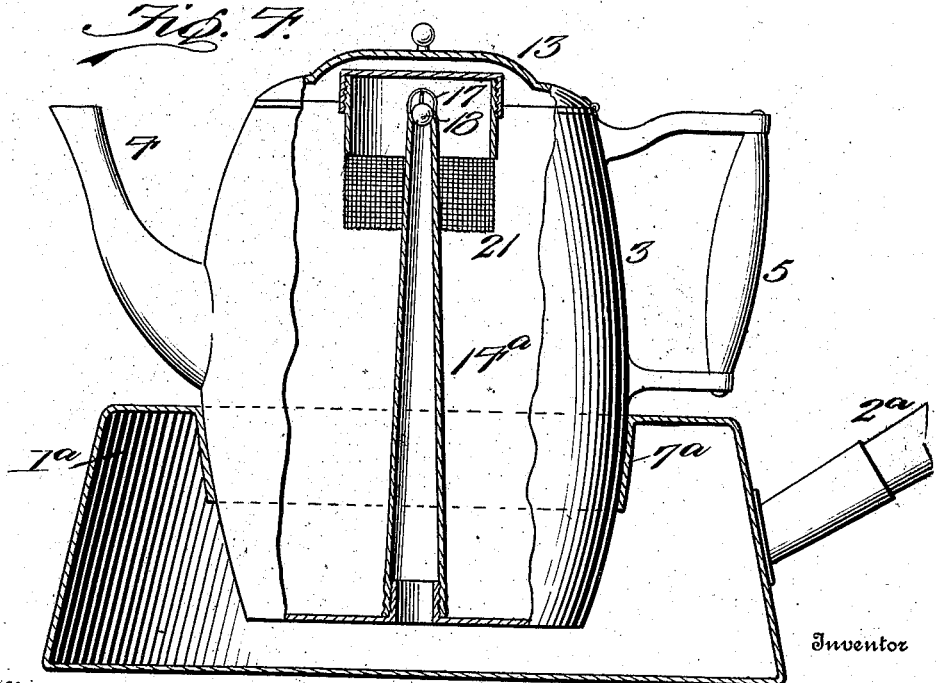

In the accompanying drawing illustrating the invention, Figure 1 is an elevational view of the percolator. Fig. 2 is a vertical sectional view thereof. Fig. 3 is a top plan view of the boiler. Fig. 4 is a view similar to Fig. 2, showing a modification.

Referring now particularly to Figs. 1 to 3, inclusive, the numeral 1 designates the base portion of the apparatus, forming a boiler or heating chamber, said boiler being provided at one side with a suitable handle 2. This boiler is adapted to receive a pot 3, which may be cylindrical or tapered in form and is provided with an ordinary pouring spout 4 and handle 5. The base receptacle or boiler 1 is provided in its top with an opening for the introduction of the water thereinto, which opening is adapted to be closed by a screw-cap 6. The top of the boiler is depressed to provide an integral well or chamber 7 to receive the lower portion of the pot 3, said chamber being formed by a vertical wall 8 and a horizontal or bottom wall 9, the latter being spaced above the bottom of the boiler to serve the function of a false bottom therefor. Rising upwardly from the center of the wall 9 is a conducting tube 10, adapted to extend upwardly into the pot and preferably provided with a tapered contracted upper end 11. The upper portion of the boiler 1 is provided at diametrically opposite sides with recesses 12 to receive the spout and handle of the pot, allowing the latter to be conveniently fitted down into position in the boiler. The pot 3 is provided with any suitable type of top lid or cover 13, and has projecting upwardly from the bottom thereof a tube or sleeve 14 adapted to receive and telescope over the tube 10, said sleeve being suitably tapered for a distance upward corresponding substantially to the length of the tube 10 and provided above the latter with a cylindrical discharge portion 15, the said tube 14 being contracted at the point of juncture of its tapered and cylindrical portions by a contracted portion 16 adapted to receive the tapered end 11 of the tube 10, thus securing a close joint between the two when fitted together for operation. The discharge portion 15 of the tube 14 carries a cage 17 in which operates a ball valve 18 adapted to open upwardly to permit of the discharge of the hot water from the tube 10 into the pot and to close by gravity to prevent the return of the same to the boiler.

It will be observed that by the construction described of forming the top plate of the boiler with a depending well to receive the lower portion of the bottom of the pot, an annular steam chamber is produced in the upper portion of the boiler between the side wall thereof and the surface of the well, whereby when the pot is inserted the bottom and a considerable portion of the body thereof will be heated to keep the coffee or other decoction hot.

As a coffee pot must be kept scrupulously clean, frequent washing is necessary. The interior must therefore be made as accessible as possible for the insertion and removal of a wash-cloth. To accomplish this additional practical and essential advantage, the telescoping tapering tube 14 is made removable through the medium of a screw-connection consisting of an externally threaded sleeve $14^a$ rising from the bottom of the coffee pot, and internal screw threads $14^b$ formed integral with the bottom of the tube. This allows the tube 14 to be readily removed so that it, as well as the pot, may be cleaned with much greater facility.

Arranged within the upper portion of the pot and supported by the cover of the discharge portion 15 of the tube 14 is a percolating chamber 19 closed by a removable screw cap 20, and having at its lower end a sieve or perforated receptacle 21 formed of any suitable perforate or reticulate material of proper mesh to hold the ground coffee therein. The coffee in ground condition is inserted through the open top of the chamber 19, which is then closed by the application of the screw cap 20.

In operation, the boiler is filled with water sufficient for a pot of coffee through the filling opening therein, which is then closed by the screw-cap 6, after which the pot 3, charged with the proper amount of ground coffee, is fitted in position, and the appliance placed upon the stove or heater. The application of the pot effects a sealed connection with the boiler through telescoping engagement of the tubes 10 and 14, so that as soon as the water in the boiler begins to boil the steam bearing down upon the hot water will force the latter upwardly through the tube 10 into the discharge portion 15 of the tube 14 and lift valve 18 and pass into the percolating chamber 19 whereby the hot water thus supplied to the percolating chamber combines with the soluble elements of the coffee and percolates slowly by gravity through the mass and discharges through the meshes of the sieve 21 down into the pot 3, where it forms a clear solution or decoction which may be drawn off for use in the ordinary manner through the spout 4.

By providing the boiler 1 in which the water is contained, the pot does not come in contact with the stove or burner, but is kept hot by the walls of the boiler, and as a result of this construction, and the fact that the coffee decoction remains in the pot and does not circulate over and over again through the percolating chamber, the decoction is not boiled and does not extract the bitter elements of the coffee, and hence is smooth, free from bitter taste and has a fine flavor and aroma. The pot is allowed to remain in the boiler in which a small amount of water is always present up to the line of the wall 9, thus allowing sufficient heat to be retained and stored to keep the coffee extract or decoction at the desired temperature for use. Moreover, as the pot does not come in direct contact with the heat the formation of the film usually burned into pots of ordinary construction which rests on the stove or come in contact with the flame is avoided; and consequently the life of the pot is prolonged and its condition remains unimpaired to produce a pure decoction free from odors. The hot water flowing through the mass of coffee tends to wash the grounds gradually down into the pot until, at the final stage of operation, the receptacle 21 is depleted or practically depleted of its contents, whereby any remaining portion of the soluble substance of the coffee will be taken up by the hot decoction and produce a decoction of maximum strength.

In the form of the invention shown in Fig. 4, the boiler 1ª is provided with a combined filling opening and well or seat receptacle formed in the top thereof, the receptacle being produced by a downwardly extending wall or flange 7ª of proper size to receive the pot and hold the same elevated a slight distance above the bottom of the boiler. After the water has passed from the boiler into the pot and falls below the bottom of the pot, the flow of water will be arrested, but sufficient will remain in the boiler to keep the pot heated. The construction of the pot is the same as that previously described except that the form of the tube 14ª is slightly different and said tube communicates directly with the boiler, the tube 10 of the latter being dispensed with. The operation of this construction is identical with that set forth in connection with the construction set forth in Figs. 1, 2 and 3, the pot fitting directly within the seat 7ª to prevent the escape of any of the generated steam.

Having thus described the invention, what is claimed as new, is:—

1. A percolator comprising a boiler having a depression in its top wall, and provided with transverse recesses at diametrically opposite sides of the depression, the wall of said depression extending downwardly into the boiler to provide a seat support, and a pot adapted to be inserted at its base through the opening into the boiler and to rest against said support, said pot being provided with the usual pouring spout and a handle adapted to fit within said recesses and having therein a percolating chamber, and means for affording communication between said chamber and the boiler through the bottom of the applied pot.

2. A percolator comprising a cylindrical boiler having a top wall provided with a central depression forming a well depending into the boiler chamber to a point above the bottom thereof, whereby an annular chamber is formed in the top of the boiler between the body thereof and the well, said boiler being sealed against the escape of steam excepting through the well, and a pot adapted to fit at its base-portion within the well so as to close the same, and to be supported thereby, whereby the bottom and a considerable portion of the body of the pot will be heated from said annular steam chamber, said pot being provided with a percolating chamber, and a removable hot water conducting tube carried by the pot and in communication with the boiler through the bottom of the pot, all arranged and adapted to operate in the manner and for the purposes specified.

In testimony whereof, I affix my signature in presence of two witnesses.

HOWARD W. REYNOLDS.

Witnesses:
 JAMES F. DUHAMEL,
 WILLIAM H. LUSK.